(12) United States Patent
Greenberg

(10) Patent No.: US 11,879,576 B2
(45) Date of Patent: Jan. 23, 2024

(54) DRYER VENT ACCESSORIES

(71) Applicant: Evan S. Greenberg, Lake Hopatcong, NY (US)

(72) Inventor: Evan S. Greenberg, Lake Hopatcong, NY (US)

(*) Notice: Subject to any disclaimer, the term of this patent is extended or adjusted under 35 U.S.C. 154(b) by 0 days.

(21) Appl. No.: 17/570,328

(22) Filed: Jan. 6, 2022

(65) Prior Publication Data

US 2022/0213994 A1 Jul. 7, 2022

Related U.S. Application Data

(60) Provisional application No. 63/205,789, filed on Jan. 8, 2021, provisional application No. 63/205,788, filed on Jan. 8, 2021, provisional application No. 63/205,769, filed on Jan. 7, 2021.

(51) Int. Cl.
| | |
|---|---|
| *F24F 13/08* | (2006.01) |
| *F16L 27/12* | (2006.01) |
| *D06F 58/20* | (2006.01) |
| *F16K 15/03* | (2006.01) |

(52) U.S. Cl.
CPC ............ *F16L 27/125* (2013.01); *D06F 58/20* (2013.01); *F16K 15/034* (2021.08); *F24F 13/082* (2013.01)

(58) Field of Classification Search
CPC .............................. F16L 27/125; F24F 13/082
USPC ........................................................ 138/155
See application file for complete search history.

(56) References Cited

U.S. PATENT DOCUMENTS

| | | | | |
|---|---|---|---|---|
| 123,992 | A * | 2/1872 | Hartley | F16L 27/0849 285/181 |
| 409,631 | A * | 8/1889 | Cooper | F16L 43/001 285/289.1 |
| 553,509 | A * | 1/1896 | Burnham | E03C 1/122 285/302 |
| 941,836 | A * | 11/1909 | Witt | F16L 27/082 285/179.2 |
| 952,938 | A * | 3/1910 | Pannenborg | F16L 45/00 126/307 R |
| 1,243,438 | A * | 10/1917 | Morris | F16L 19/0212 193/2 A |

(Continued)

*Primary Examiner* — Craig M Schneider
*Assistant Examiner* — Frederick D Soski
(74) *Attorney, Agent, or Firm* — Locke Lord LLP; Daniel J. Fiorello; Gabrielle L. Gelozin

(57) ABSTRACT

In accordance with at least one aspect of this disclosure, an adjustable vent tube joint for passing airflow therethough includes, a first segment, a flange extending radially from an outer diameter of the first segment, configured to mount to the vent tube joint to a structure, a second segment rotatably connected to the first segment, and a third segment rotatably connected to the second segment. In accordance with at least one aspect of this disclosure, an adjustable vent pipe can include, a first segment and a second segment concentric with the first segment, the second segment being slidable relative to the first segment. In accordance with at least one aspect of this disclosure, an insert for an exhaust termination can include, a frame configured to fit within an existing louvered exhaust termination, a hinge member, and a flap operatively connected to the frame via the hinge member configured to open with an exhaust flow to connect a dryer exhaust outlet to an ambient external environment through the exhaust termination.

3 Claims, 7 Drawing Sheets

(56) References Cited

U.S. PATENT DOCUMENTS

| | | | | |
|---|---|---|---|---|
| 1,278,894 A * | 9/1918 | Falk | F16L 37/23 | 285/302 |
| 1,309,315 A * | 7/1919 | Blank | B65G 65/00 | 193/17 |
| 1,352,118 A * | 9/1920 | Dow | F16L 37/252 | 285/402 |
| 1,661,674 A * | 3/1928 | Osborn | F16L 37/084 | 285/424 |
| 1,706,525 A * | 3/1929 | Gullion | F23J 13/04 | 285/179 |
| 2,344,424 A * | 3/1944 | Singleton | F16L 1/10 | 285/179 |
| 2,614,867 A * | 10/1952 | Artis, Jr. | F23J 13/04 | 285/44 |
| 2,756,076 A * | 7/1956 | Rodriguez, Jr. | E03C 1/122 | 285/179 |
| 3,222,777 A * | 12/1965 | Rutter | F16L 59/16 | 285/133.11 |
| 3,842,722 A * | 10/1974 | Miller | F24F 13/06 | 137/527.6 |
| 3,860,043 A * | 1/1975 | Kutnyak | F16L 43/008 | 285/236 |
| 4,151,789 A * | 5/1979 | Grobard | F16L 37/008 | 403/349 |
| 4,237,621 A * | 12/1980 | Boismenu | D06F 58/20 | 34/235 |
| 4,334,461 A * | 6/1982 | Ferguson | F24F 13/02 | 34/235 |
| 4,380,126 A * | 4/1983 | Kinder | D06F 58/20 | 34/607 |
| 5,046,408 A * | 9/1991 | Eugenio | F24F 13/1426 | 137/527.6 |
| 5,098,135 A * | 3/1992 | Timm | F16L 27/125 | 165/89 |
| 5,482,507 A * | 1/1996 | Priest | F24F 13/075 | 34/235 |
| 5,716,271 A * | 2/1998 | Paidosh | D06F 58/20 | 454/359 |
| 5,722,181 A * | 3/1998 | Meyer | D06F 58/20 | 34/235 |
| 5,819,435 A * | 10/1998 | Tuggle | D06F 58/20 | 138/155 |
| 5,916,023 A * | 6/1999 | Meyer | D06F 58/14 | 34/235 |
| 5,970,623 A * | 10/1999 | Tuggle | D06F 58/20 | 34/235 |
| 6,098,312 A * | 8/2000 | Tuggle | D06F 58/20 | 285/298 |
| 6,185,837 B1 * | 2/2001 | Tuggle | F16L 27/0804 | 34/235 |
| 6,299,529 B1 * | 10/2001 | Preston | F24F 13/082 | 454/367 |
| 6,302,788 B1 * | 10/2001 | Gagnon | D06F 58/20 | 454/367 |
| 6,370,794 B1 * | 4/2002 | Tuggle | D06F 58/20 | 454/270 |
| 6,443,834 B1 * | 9/2002 | Berger | F24F 13/06 | 454/353 |
| 6,682,415 B1 * | 1/2004 | Vagedes | F24F 7/00 | 454/339 |
| 6,772,538 B2 * | 8/2004 | Vagedes | D06F 58/20 | 454/359 |
| 6,780,100 B1 * | 8/2004 | Gretz | F24F 7/00 | 34/235 |
| 6,974,379 B2 * | 12/2005 | Koessler | F24F 13/18 | 454/367 |
| 7,147,554 B1 * | 12/2006 | Berger | F24F 13/084 | 454/359 |
| D556,315 S * | 11/2007 | Jackson | D23/393 | |
| 7,358,440 B1 * | 4/2008 | Funk | H02G 3/10 | 174/64 |
| 7,393,021 B1 * | 7/2008 | Lukjan | F16L 37/084 | 285/183 |
| 7,510,623 B2 * | 3/2009 | Lutz | B29C 66/5221 | 138/155 |
| D626,644 S * | 11/2010 | Jacak | D23/393 | |
| 7,988,544 B2 * | 8/2011 | Vanden Bosch | F24F 7/00 | 454/367 |
| 8,033,900 B2 * | 10/2011 | Vanden Bosch | F24F 13/14 | 454/339 |
| 8,429,803 B2 * | 4/2013 | Coughenour | F16L 21/08 | 29/451 |
| D704,811 S * | 5/2014 | Yu | D23/262 | |
| 9,163,763 B2 * | 10/2015 | Hedlund | F16L 27/1275 | |
| 9,382,658 B2 * | 7/2016 | Tarifi | D06F 58/22 | |
| 9,441,854 B2 * | 9/2016 | Ramsay | F24F 7/00 | |
| 9,500,380 B2 * | 11/2016 | Ramsay | F24F 7/00 | |
| 9,689,108 B2 * | 6/2017 | Hamman, Jr. | D06F 58/20 | |
| 9,840,806 B1 * | 12/2017 | Simoes | D06F 58/22 | |
| 10,267,533 B2 * | 4/2019 | Mantyla | F24F 13/082 | |
| D873,989 S * | 1/2020 | Jordan | D23/393 | |
| D885,527 S * | 5/2020 | Kresge | D23/260 | |
| 10,876,757 B2 * | 12/2020 | Volpe | F24F 13/12 | |
| 11,359,328 B1 * | 6/2022 | Kelley | D06F 58/20 | |
| 2005/0202778 A1 * | 9/2005 | Stravitz | F24F 13/105 | 34/235 |
| 2005/0217882 A1 * | 10/2005 | Rizzuto, Jr. | F16L 27/125 | 174/480 |
| 2006/0025067 A1 * | 2/2006 | Koessler | F24F 7/02 | 454/366 |
| 2007/0010191 A1 * | 1/2007 | Vanden Bosch | F24F 7/00 | 454/359 |
| 2008/0168722 A1 * | 7/2008 | Hendricks | F24F 13/082 | 52/198 |
| 2009/0023379 A1 * | 1/2009 | Bredahl | F24F 13/1413 | 454/363 |
| 2009/0236847 A1 * | 9/2009 | Hall | F16L 25/12 | 285/31 |
| 2009/0280737 A1 * | 11/2009 | Jacak | F24F 11/745 | 454/359 |
| 2010/0297924 A1 * | 11/2010 | Hedlund | F16L 27/0857 | 454/64 |
| 2011/0076937 A1 * | 3/2011 | Greenberg | F24F 13/082 | 454/367 |
| 2011/0097990 A1 * | 4/2011 | Charron | D06F 58/20 | 454/367 |
| 2013/0233435 A1 * | 9/2013 | Henthorn | F16L 25/065 | 138/155 |
| 2014/0170962 A1 * | 6/2014 | Carter | F24F 13/082 | 454/367 |
| 2015/0354127 A1 * | 12/2015 | Ott | D06F 58/20 | 34/235 |
| 2016/0305686 A1 * | 10/2016 | Plummer | F24F 13/082 | |
| 2019/0128454 A1 * | 5/2019 | Chirko | F16L 27/1274 | |
| 2020/0121966 A1 * | 4/2020 | Jung | A62C 35/68 | |
| 2021/0239241 A1 * | 8/2021 | Mullins | F16L 1/26 | |
| 2022/0098787 A1 * | 3/2022 | Kiker | D06F 58/22 | |

\* cited by examiner

DRYER VENT ACCESSORIES

CROSS-REFERENCE TO RELATED APPLICATIONS

This application claims priority to and the benefit of U.S. Provisional Application No. 62/205,769, filed Jan. 7, 2021; U.S. Provisional Patent Application No. 63/205,788, filed Jan. 8, 2021; and U.S. Provisional Patent No. 63/205,789, filed Jan. 8, 2021, the entire contents of each application being herein incorporated by reference.

TECHNICAL FIELD

The present disclosure relates to dryer vent accessories.

BACKGROUND

Current dryer vent technologies do not provide for easy and efficient installation of solid vent piping between an exhaust outlet of a dryer and an exhaust termination. Supplying such tubing may require an installer to physically form the vent piping, and may require laying tubing in inconvenient locations or require extensive cutting, measuring, and crimping on site. Moreover, current exhaust terminations, such as louvered terminations can be inefficient and collect debris (e.g., dryer sheets) or lint, increasing the possibility of a dryer fire.

There remains a need in the art for improved dyer vent accessories that allow for faster and easier installation of such accessories, as well as enhanced performance in use. This disclosure provides a solution for this need.

SUMMARY

In accordance with at least one aspect of this disclosure, an adjustable vent tube joint for passing airflow therethough includes, a first segment, a flange extending radially from an outer diameter of the first segment, configured to mount to the vent tube joint to a structure, a second segment rotatably connected to the first segment, and a third segment rotatably connected to the second segment. In embodiments, the vent tube joint is a solid vent tube joint.

In embodiments, the flange can be fixed to the outer diameter of the first segment. In embodiments, the first segment can be configured to rotate independent of and relative to the second segment, the second segment can be configured to rotate independent of and relative to the first segment and the third segment, and the third segment can be configured to rotate independent of and relative to the second segment. In embodiments, the second segment and the third segment can be configured to rotate relative to the first segment and relative to each other when the flange is mounted to the structure.

In certain embodiments, the structure can include a roof structure. In certain embodiments, the structure can include a wall structure. In certain embodiments, a terminal edge of the first segment can be configured to sit flush with an outward facing surface of the structure when the flange is mounted to the structure. In embodiments, the terminal edge of the third segment can be configured to accept another vent pipe. In embodiments, the terminal edge of the third segment can be configured to be inserted into a vent pipe, for example if used for a chimney or a pellet stove.

In embodiments, the first segment, the second segment, and the third segment can be configured to form a 90 degree elbow when the flange is mounted to the structure. In embodiments, the first segment, the second segment, and the third segment can be configured to form any angle such that a terminal edge of the third segment can face in any direction relative to the terminal edge of the first segment.

In embodiments, the adjustable vent tube joint can be configured to connect an exhaust outlet of a dryer to an external ambient environment through the structure. In certain embodiments, the adjustable vent tube joint can be formed of galvanized steel. In embodiments, adjustable vent tube joint can be formed of stainless steel.

In accordance with at least one aspect of this disclosure, a method can include installing a first segment of an adjustable vent tube joint into an aperture of a structure, mounting a flange extending radially from an outer diameter of the first segment to the structure such that a terminal edge of the first segment is flush with an outward facing surface of the structure, and adjusting one or more of a second and/or third segment of the adjustable vent tube joint, relative to a terminal edge of the first segment, to mate the third segment with a section of a connecting vent tube in any direction.

In accordance with at least one aspect of this disclosure, an adjustable vent pipe can include, a first segment and a second segment concentric with the first segment, the second segment being slidable relative to the first segment to adjust a total length of the adjustable vent pipe. A first end of the adjustable vent pipe can include a belled end configured to accept a second vent pipe, and a second end of the adjustable vent pipe opposite the first end can include a shrunken end configured to be inserted into a third vent pipe. In embodiments, the adjustable vent pipe is a solid vent pipe and does not include flexible tubing or piping. In embodiments, the adjustable vent pipe does not include corrugation or crimping.

In embodiments, the first segment and the second segment can be formed such that no seam exists along an axial length of the first segment and the second segment. In embodiments, the first and second segments can be pre-formed, such that an installer is not required to form a tube and clamp the tube into its final shape. In embodiments, the tube shape of the first segment and the second segment can be formed by laser welding.

In embodiments, the connection between the first segment and the second segment does not provide for lateral movement of either the first and/or second segment relative to the other. In certain embodiments, the first end can also include a circumferential groove configured to house a sealing member on an internal surface of the first segment to create a seal between the first end and an additional vent pipe inserted therein. In certain embodiments, the first end can be configured to accept the second vent pipe and create a seal with an additional vent pipe inserted therein without a sealing member.

In certain embodiments, the first segment can be inside the second segment. In embodiments, a length of the first segment and a length of the second segment can be the same, such that the adjustable vent pipe is configured to adjust between a length of the second segment and a length double, or nearly double, the length of the second segment. In certain embodiments, a length of the first segment and a length of the second segment can be different. In certain such embodiments, the adjustable vent pipe can be configured to adjust between a length of the second segment plus a portion of the length of the first segment and a length greater than double the length of the second segment. In certain embodiments, the adjustable vent pipe can be configured to adjust between a length of the second segment plus a portion of the length of the first segment and a length less than double the length of the second segment.

In embodiments, the adjustable vent pipe can be configured to connect between an exhaust outlet of a dryer and an exhaust termination mounted in a structure. In certain embodiments, one or more adjustable solid vent pipes can be configured to connect between the exhaust outlet of the dryer and the exhaust termination in a structure without pre-measuring the vent pipe. In certain embodiments, one or more adjustable vent pipes can be configured to connect between the exhaust outlet of the dryer and the exhaust termination in the structure without cutting the adjustable vent pipe to size. In embodiments, one or more adjustable vent pipes can be configured to connect between the exhaust outlet of the dryer and the exhaust termination of the structure without crimping the second end of the adjustable vent pipe.

In accordance with at least one aspect of this disclosure, a method can include, connecting an exhaust outlet of a dryer with an exhaust termination in a structure with one or more adjustable vent pipes, wherein connecting includes, adjusting a length of one or more of the one or more adjustable vent pipes to fit between the exhaust outlet of the dryer and the exhaust termination without measuring, cutting, or crimping the adjustable vent pipe.

In accordance with at least one aspect of this disclosure, an insert for an exhaust termination can include, a frame configured to fit at least partially within an existing louvered exhaust termination frame, a hinge member, and a single flap operatively connected to the frame via the hinge member configured to open with an exhaust flow to connect a dryer exhaust outlet to an ambient external environment through the exhaust termination.

In embodiments, the insert does not include any segment of vent pipe operatively connected thereto. In embodiments, the insert can be configured to mount within the existing exhaust termination with one or more fasteners. In embodiments, the one or more fasteners can include screws.

In certain embodiments, the insert can also include a cage. In embodiments, the cage can include one or more vertical bars or horizontal bars extending between a first end and a second end of the frame configured to prevent foreign objects from entering the exhaust termination when the flap is open. In embodiments, the cage can be separable from the insert, and can be configured to be mounted to the frame via the one or more fasteners. In embodiments, the flap can be configured such that the cage is not visible when the flap is closed and/or when the flap is open by airflow when viewing the insert head on. In embodiments, the flap may not be louvered such that the flap is the only flap. In embodiments, the frame can include four corner fastener holes for allowing mounting to the existing louvered exhaust termination frame. In embodiments, the insert can be constructed from metal.

In accordance with at least one aspect of this disclosure, a method for retrofitting an exhaust termination can include, removing one or more louvers from an exhaust termination mounted in a structure, while the exhaust termination remains mounted in the structure, inserting an insert into the exhaust termination, and mounting the insert to the exhaust termination.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
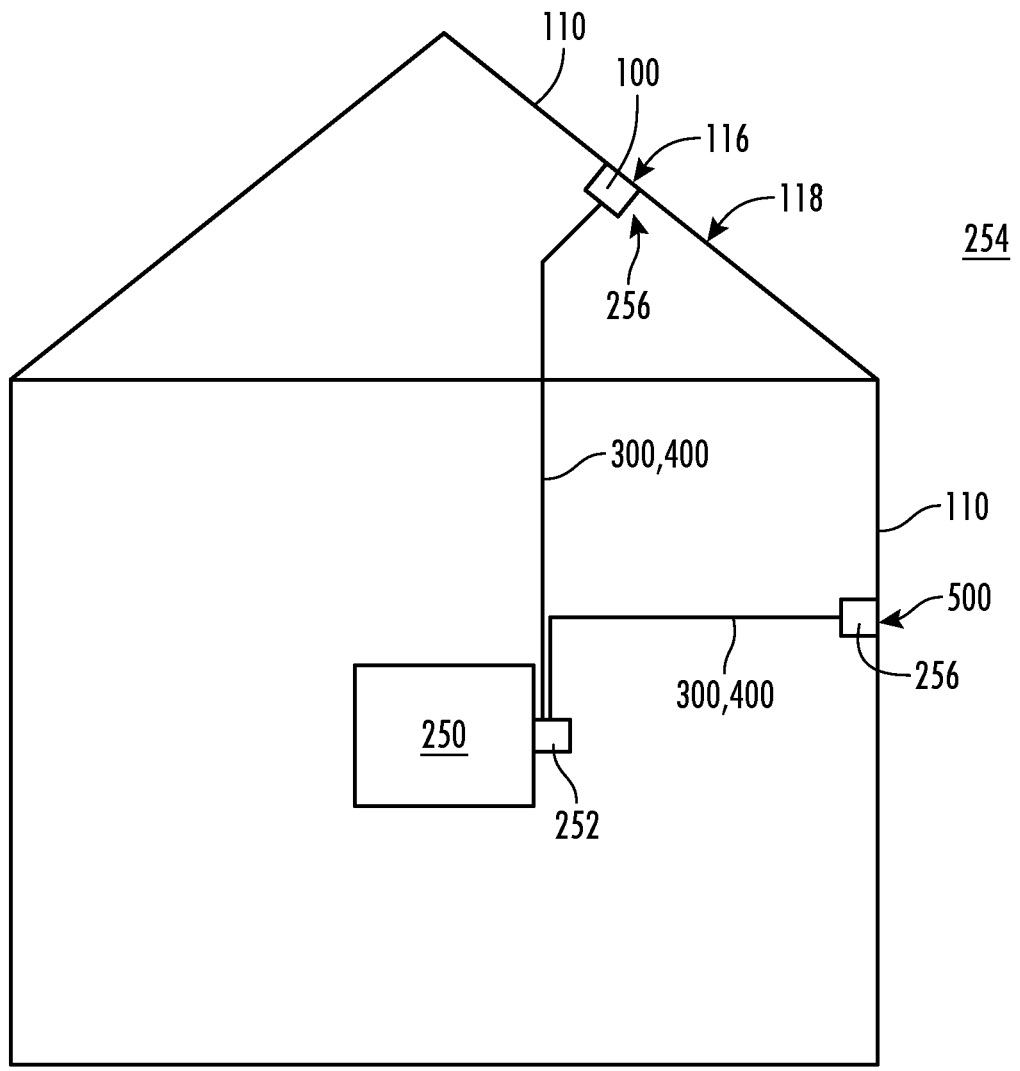
FIG. 1 is a schematic diagram in accordance with this disclosure, showing a structure having a dryer and related accessories installed therein connecting between the dryer and the structure.

Reference will now be made to the drawings wherein like reference numerals identify similar structural features or aspects of the subject disclosure. For purposes of explanation and illustration, and not limitation, an illustrative view of an embodiment of one or more dryer vent accessories in accordance with the disclosure is shown in FIG. 1. Other embodiments and/or aspects of this disclosure are shown in FIGS. 2-7. Certain embodiments can be used to make existing termination more efficient by improving airflow and removing collection points for lint or debris. Embodiments allow for replacing broken, missing, or warped louver flaps that are no longer available.

Figure 2:
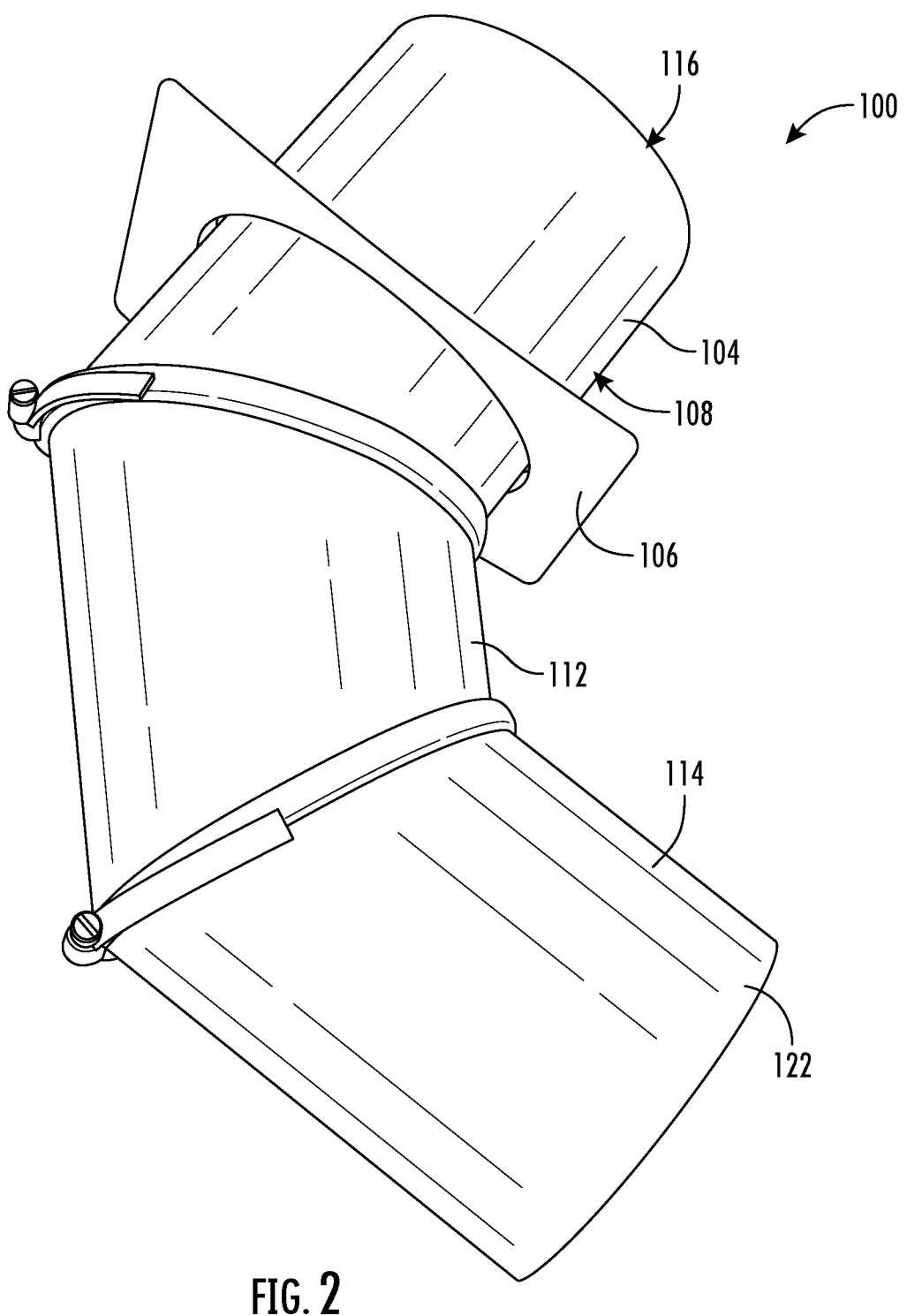
FIG. 2 is a side view of an embodiment of an adjustable vent tube joint accessory configured to mount to the structure of FIG. 1.
Figure 3:
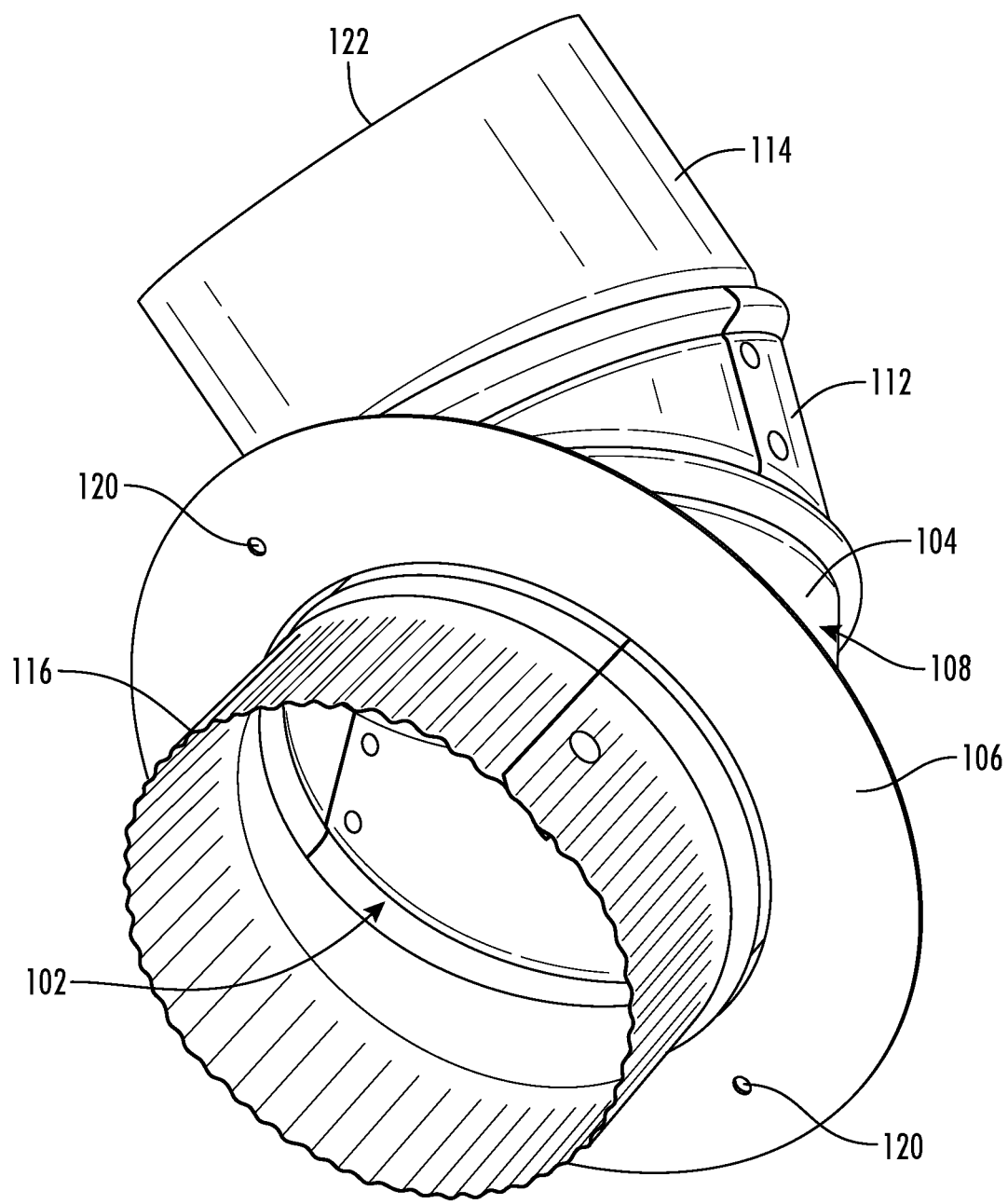
FIG. 3 is a front perspective view of an embodiment of another adjustable vent tube joint accessory configured to mount to the structure of FIG. 1.

In accordance with at least one aspect of this disclosure, as shown in FIGS. 1-3, an adjustable vent tube joint 100 for passing airflow therethough has a generally tubular shape formed around an interior space 102, and can be a solid vent tube. The joint 100 can include first segment 104, a flange 106 extending radially from an outer diameter 108 of the first segment 104, configured to mount to the vent tube joint 100 to a structure 110. A second segment 112 can be rotatably connected to the first segment 104 and a third segment 114 can be rotatably connected to the second segment 112.

In embodiments, the flange 106 can be fixed to the outer diameter 108 of the first segment 104. In embodiments, the first segment 104 can be configured to rotate independent of and relative to the second segment 112, the second segment 112 can be configured to rotate independent of and relative to the first segment 104 and the third segment 114, and the third segment 114 can be configured to rotate independent of and relative to the second segment 112. In embodiments, the second segment 112 and the third segment 114 can be configured to rotate relative to the first segment 104 and relative to each other when the flange 106 is mounted to the structure 110.

In certain embodiments, the structure 110 can include a roof structure (e.g., as shown in FIG. 1), or can include a wall structure. In certain embodiments, a terminal edge 116 of the first segment can be configured to sit flush with an outward facing surface 118 of the roof structure 110 when the flange 106 is mounted to the roof structure 110, where the first segment sits within an aperture in the structure 110. The flange 106 can be mounted to the roof structure via a plurality of fasteners extending through a respective aperture 120 in the flange 106. The flange can be configured to mount to either an outer surface of the structure or an inner surface of the structure, so long as the terminal edge 116 is flush with the outward facing surface 118. In certain embodiments, the flange 106 can be fixed to the first segment 104 about ⅞ inch from the terminal edge 116, however any suitable distance is contemplated herein. In embodiments, a terminal edge 116 of the first segment 104 can be a shrunken end, and the terminal edge 122 of the third segment 114 can be configured to accept a vent pipe (e.g., belled). In embodiments, the terminal edge 122 of the third segment 114 can be configured to be inserted into a vent pipe (e.g., if used with a chimney or pellet stove).

In embodiments, the first segment 104, the second segment 112, and the third segment 114 can be configured to form a 90 degree elbow when the flange 106 is mounted to the structure 110. In embodiments, the first segment 104, the second segment 112, and the third segment 114 can be configured to form any angle such that the terminal edge 122 of the third segment 114 can face in any direction relative to the terminal edge 116 of the first segment 104.

In embodiments, the adjustable vent tube joint 100 can be configured to connect an exhaust outlet 252 of a dryer 200 to an external ambient environment 254 through the structure 110 and via an exhaust termination 256 (e.g., as shown in FIG. 1). In certain embodiments, the adjustable vent tube joint 100 can be formed of galvanized steel. In embodiments, adjustable vent tube joint 100 can be formed of stainless steel.

In accordance with at least one aspect of this disclosure, a method can include, installing a first segment (e.g., segment 104) of an adjustable vent tube joint (e.g., joint 100) into an aperture of a structure, mounting a flange (e.g., flange 106) extending radially from an outer diameter of the first segment to the structure such that a terminal edge (e.g., edge 116) of the first segment is flush with an outward facing surface of the structure, and adjusting one or more of a second and/or third segment (e.g., segments 112, 114) of the adjustable vent tube joint relative to a terminal edge of the first segment, to mate the third segment with a section of a connecting vent tube in any direction.

Figure 4:
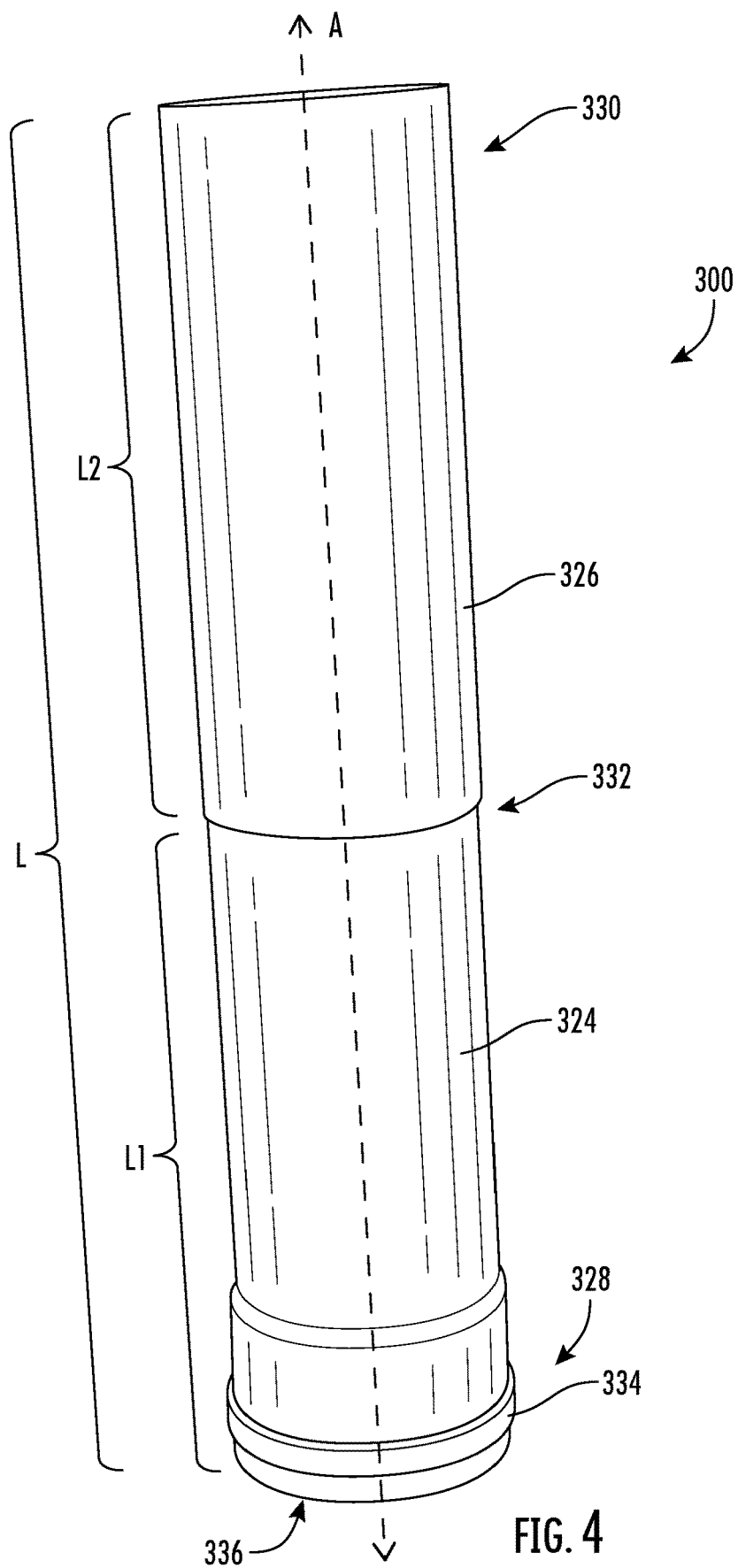
FIG. 4 is a side view of an embodiment of an adjustable vent pipe accessory configured to extend between the dryer of FIG. 1 and the structure of FIG. 1.
Figure 5:
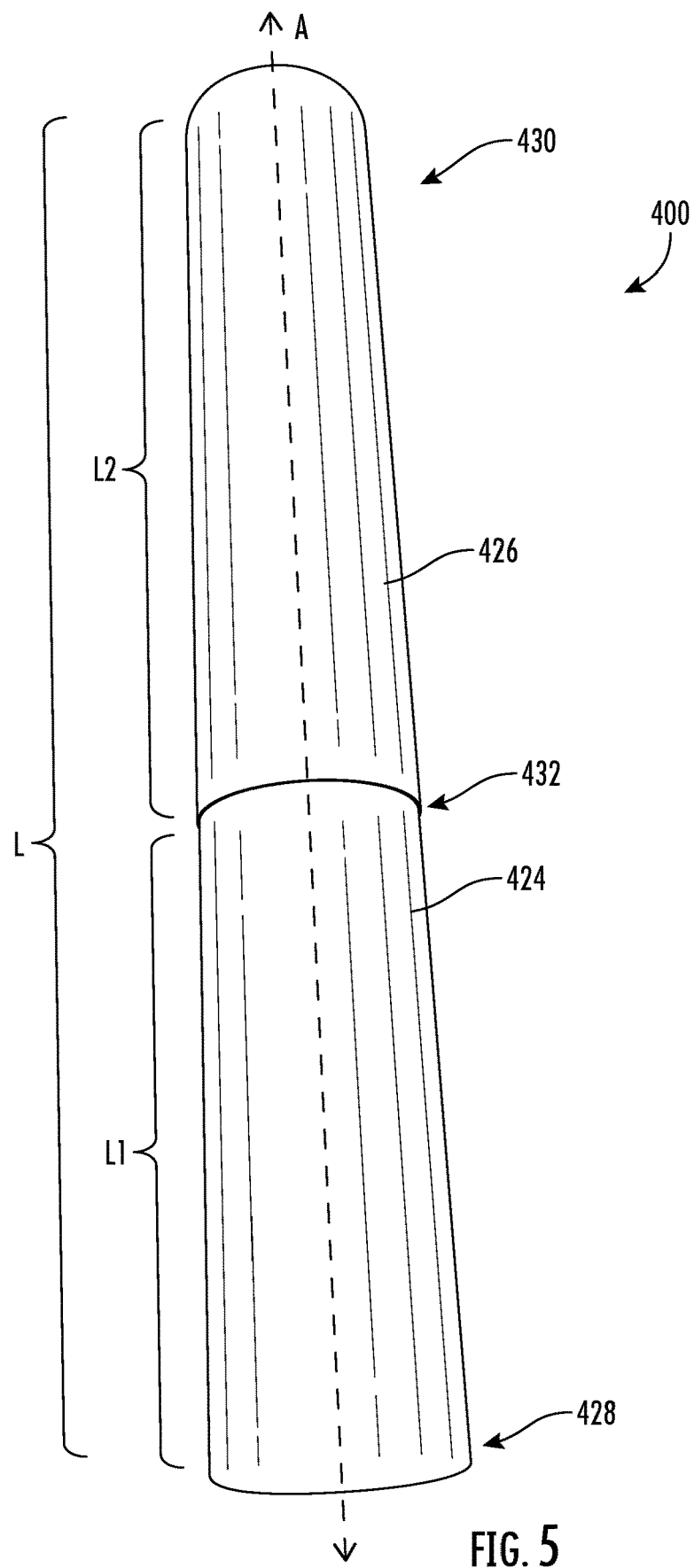
FIG. 5 is a side view of an embodiment of another adjustable vent pipe accessory configured to extend between the dryer of FIG. 1 and the structure of FIG. 1.

In accordance with at least one aspect of this disclosure, as shown in FIGS. 1, 4 and 5, an adjustable vent pipe 300, 400 can include, a first segment 324, 424 and a second segment 326, 426 concentric with the first segment 324, 424, the second segment 326, 426 being slidable relative to the first segment 324, 424 to adjust a total length L of the adjustable vent pipe 300, 400. The adjustable vent pipe 300, 400 can be a solid vent pipe. A first end 328, 428 of the adjustable vent pipe 300, 400 (e.g., a free end of the first segment 324, 424) can include a belled end configured to accept a second vent pipe, and a second end 330, 430 of the adjustable vent pipe 300, 400 (e.g., a free end of the second segment 326, 426) opposite the first end 328, 428 can include a smooth shrunken end (e.g., not crimped or corrugated) configured to be inserted into a third vent pipe. Corrugated or crimped ends can leak, decrease efficiency of airflow, and catch lint or cleaning tools. In embodiments, the adjustable vent pipe 300, 400 does not include flexible tubing, and in embodiments, the vent pipe 300, 400 is not corrugated.

In embodiments, the first segment 324, 424 and the second segment 326, 426 can be formed such that no seam exists along an axial length A of the first segment 324, 424 and the second segment 326, 426. In embodiments, the first 324, 424, and second 326, 426 segments can be pre-formed, such that an installer is not required to form a tube or clamp the tube into its final shape. In embodiments, the tube shape of the first segment 324, 424 and the second segment 326, 426 can be formed by forming a flat sheet into a tube shape and laser welding the edges so that no visible seam is formed. It is contemplated the seamless tube shape can be formed by extrusion, or any other suitable manner. Conventional vent tubes having an axial seam clamped with fasteners provide a number of locations for lint to collect and form a clog. A clogged vent pipe or a pipe having collected lint therein can decrease the performance of the dryer unit, decrease airflow, as well as increase the chance of a dryer fire. The adjustable vent tube 300, 400 being a seamless tube eliminates collection points for lint, decreasing the chance of clogs and dryer fires, and improving the airflow from the dryer to the termination.

In embodiments, a connection 332, 432 between the first segment 324, 424 and second segment 326, 426 does not provide for lateral movement of either the first 324, 424 and/or second 326, 426 segment relative to the other. In certain embodiments, such as shown in FIG. 4, the first end 328 can also include a circumferential groove 334 configured to house a sealing member (not shown) on an internal surface 336 of the first segment 324 to create a seal between the first end 324 and an additional vent pipe inserted therein. In certain embodiments, such as shown in FIG. 5, the first end 428 can be configured to accept the second vent pipe and create a seal with the second vent pipe inserted therein without a sealing member.

In certain embodiments (e.g., as shown), the first segment 324 can be inside the second segment 326. In embodiments, a length L1 of the first segment 324, 424, and a length L2 of the second segment 326, 426 can be the same, such that the adjustable vent pipe 300, 400 is configured to adjust between a length L2 of the second segment 326, 426 and a length L nearly double the length of the second segment 326, 426, or any length in between. For example, in certain embodiments, the adjustable vent pipe can extend between about 12 inches and a maximum of about 24 inches.

In certain embodiments, a length L1 of the first segment 324, 424 and a length L2 of the second segment 326, 426 can be different. In certain such embodiments, the adjustable vent pipe 300, 400 can be configured to adjust between a length L2 of the second segment 326, 426 plus a portion of the length L1 of the first segment 324, 424 and a length L greater than double the length L2 of the second segment 326, 426, or any length in between. For example, the length L2 can be greater than the length L1 when the vent pipe 300, 400 is not fully extended, so that when fully extended the length L can increase from about 48 inches to about 96 inches. In certain embodiments, the adjustable vent pipe 300, 400 can be configured to adjust between a length L2 of the second segment 326, 426 plus a portion of the length L1 of the first segment 324, 424 and a length less than double the length L2 of the second segment 326, 426, or any length in between. For example, the length L2 can be less than the length L1 when the vent pipe 300, 400 is not fully extended, so that when fully extended the length L can increase from about 12 inches to about 20 inches. In certain embodiments, it may be beneficial to have increased overlap between the first segment 324, 424, and the second segment 326, 426, for example about a three to four inch overlap.

In embodiments, the adjustable vent pipe 300, 400 can be configured to connect between the exhaust outlet 252 of the dryer 250 and an exhaust termination 256 in a structure 110 (e.g., as shown in FIG. 1). In certain embodiments, one or more adjustable vent pipes 300, 400 can be configured to connect between the exhaust outlet 252 of the dryer 250 and the exhaust termination 256 without pre-measuring the vent pipe 300, 400, without cutting the vent pipe 300, 400 to size, and without crimping the second end 330, 430 of the vent pipe 300, 400.

Conventionally, solid vent pipes are sold in standard increments, such as two feet and five feet sections, for example. Therefore, in order to make a three foot connection, either two, two feet sections, or a single, five feet section would be needed. The installer would then need to form the tube and clamp the tube shape, and measure out a one foot section, crimp one end, and insert the one foot section into the two feet section. Or, alternatively, the installer would need to measure and cut down the five feet section and still crimp the free end to be able to insert into the next connection. The adjustable vent pipe 300, 400 would only require the installer to choose a single vent pipe, adjust the length to size, and make the connection. The adjustable vent pipes 300, 400 therefore remove the forming, clamping, cutting, measuring and crimping steps altogether, providing an easier and more efficient installation.

Embodiments of the adjustable solid vent pipe can include 28 gauge vent pipe. Code compliant dryer vent solid piping should be 28 gauge or thicker. Currently, 26 gauge piping, while code compliant, can be too thick in certain instances, can be more difficult to work with and much more expensive than thinner alternatives. However, 30 gauge piping is not code compliant, but sometimes is used in order to have a thinner pipe and to save costs, though working around code. 28 gauge solid vent piping, such as provided herein with respect to adjustable vent pipe 300, 400 allows for a thinner pipe, making installation cheaper and easier for installers, while still maintaining compliance with code.

In accordance with at least one aspect of this disclosure, a method can include (e.g., as shown in FIG. 1), connecting an exhaust outlet of a dryer with an exhaust termination in a structure with one or more adjustable vent pipes (e.g., vent pipes 300, 400), where connecting includes, adjusting a length L of one or more of the one or more adjustable vent pipes to fit between the exhaust outlet of the dryer and the exhaust termination without cutting or crimping the adjustable vent pipe.

Figure 6:
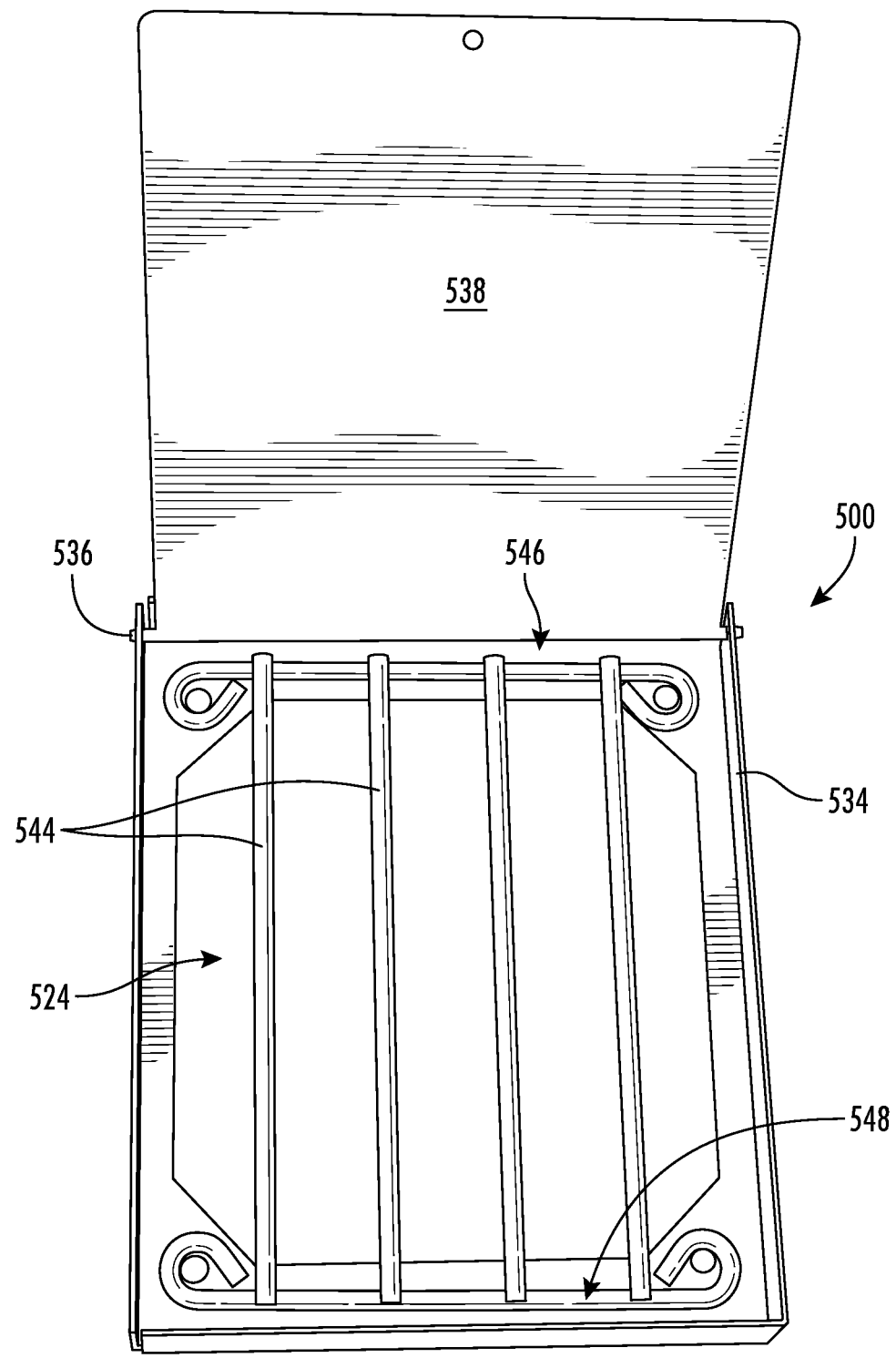
FIG. 6 is a front view of an insert accessory for an exhaust termination configured to mount to the structure of FIG. 1, showing a flap in an open position.
Figure 7:
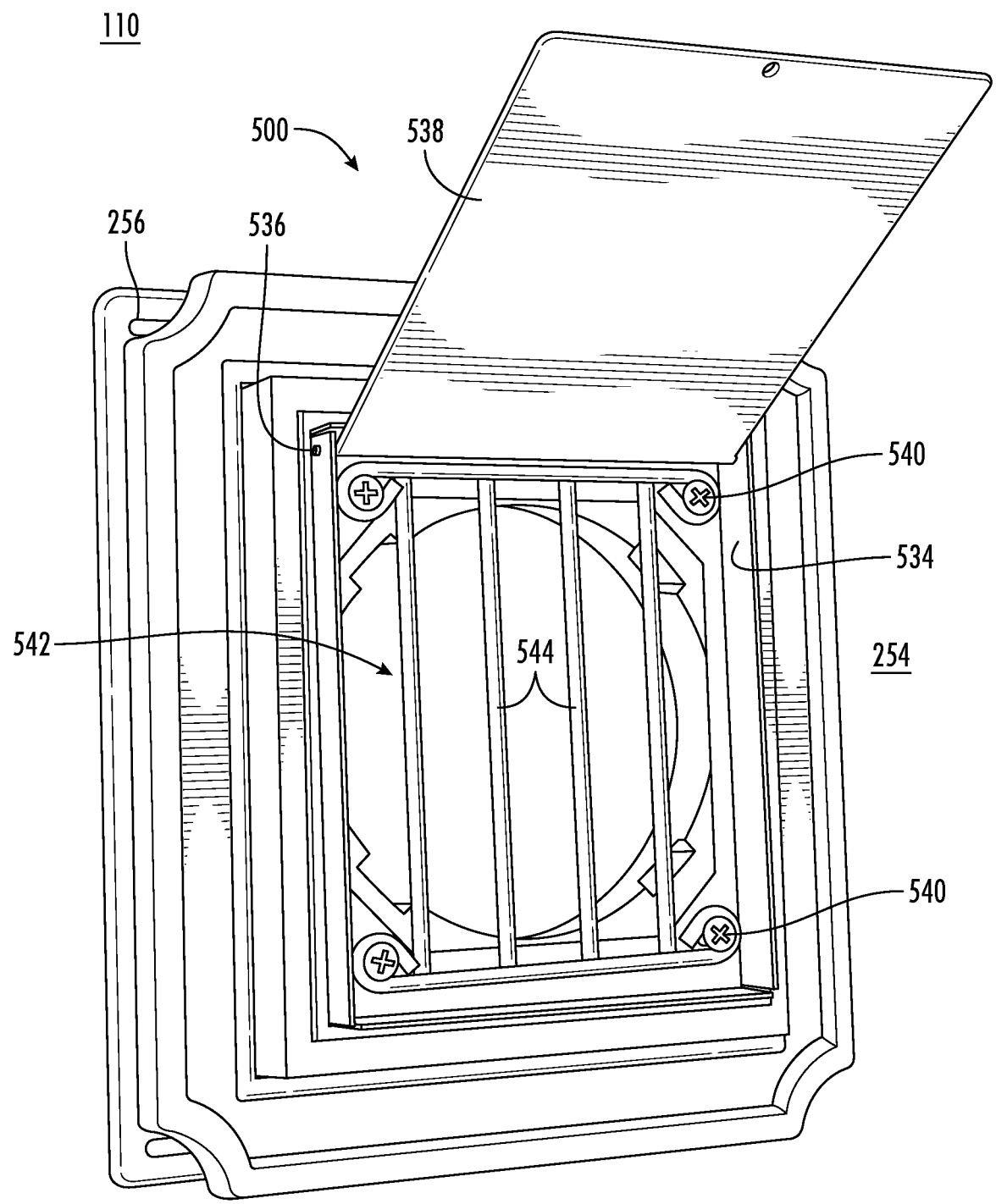
FIG. 7 is a perspective environmental view of the insert accessory of FIG. 6, showing the insert accessory mounted within an existing exhaust termination, e.g., mounted to the structure of FIG. 1.

In accordance with at least one aspect of this disclosure, as shown in FIGS. 1, 6 and 7, an insert 500 for an exhaust termination 256 can include, a frame 534 configured to fit at least partially within an existing louvered exhaust termination frame 256, a hinge member 536 (e.g., a tab as shown), and a single flap 538 operatively connected to the frame 534 via the hinge member 536. The flap 538 can be configured to open with an exhaust flow to connect the dryer exhaust outlet 252 to an ambient external environment 254 through the exhaust termination 256 (e.g., as shown in FIG. 1).

In embodiments, the insert 500 does not include any segment of vent pipe operatively connected thereto. In embodiments, the insert 500 can be configured to mount within the existing exhaust termination 256 with one or more fasteners 540. In embodiments, the one or more fasteners 540 can include screws.

In certain embodiments, the insert 500 can also include a cage 542. In embodiments, the cage 542 can include one or more vertical bars 544 extending between a first and second end 546, 548 of the frame 534 configured to prevent foreign objects, such as large debris, birds, or squirrels, for example, from entering the exhaust termination 256 when the flap 538 is open. In certain embodiments, the cage 542 may include horizontal bars, or any suitable combination of vertical and horizontal bars. In embodiments, the cage 542 can be separable from the insert 500, and can be configured to be mounted to the frame 534 via the one or more fasteners 540 (e.g., the same fasteners 540 used to mount the insert 500). For example, in certain embodiments, the frame 534 can include four corner fastener holes for allowing mounting to the louvered exhaust termination frame via four fasteners 540. In embodiments, the flap 538 can be configured such that the cage 542 is not visible when the flap 538 is closed and/or when the flap 538 is open by airflow when viewing the insert head on. In embodiments, the flap 538 is not louvered and the flap 538 can be the only flap. In embodiments, the insert 500 can be constructed from metal. In certain instances, a louvered exhaust termination can collect lint or other debris passing through the vent piping, causing a clog and/or inefficient exhausting at the louvers. The single flap design as described herein proves advantageous over conventional louvered designs.

In accordance with at least one aspect of this disclosure, a method for retrofitting an exhaust termination can include, removing one or more louvers from an exhaust termination mounted in a structure, while the exhaust termination remains mounted in the structure, inserting an insert (e.g., insert 500) into the exhaust termination, and mounting the insert to the exhaust termination.

In certain instances, conventional louvered terminations may dry out, break, or experience wear, such that one or more louvers may break off of the termination. In this case, it may not be possible to replace a single louver. Moreover, once a louver has been removed (e.g., by weather or animals), the termination becomes available for animals to create nests. Lint collected in the vent pipe or the louvered termination and/or a nest in the termination, decreases airflow between the dryer exhaust and the termination. Such a clog can decrease performance of the dryer unit, and can also increase the chance of a dryer fire. Therefore, the insert 500 offers a replacement for the louvered frame, without having to replace the termination entirely, and provides for better airflow through the termination than the conventional louvered termination.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. An insert for an exhaust termination, comprising:
   a frame configured to fit at least partially within an existing louvered exhaust termination frame;
   a hinge member; and
   a single flap operatively connected to the frame via the hinge member configured to move between an open and closed position with an exhaust flow of a dryer to connect a dryer exhaust outlet to an ambient external environment through the exhaust termination, wherein in the closed position the single flap is configured to cover the exhaust termination to prevent ingress of ambient air into the exhaust termination and wherein in the open position the single flap is configured extend away from the exhaust termination to allow egress of the exhaust flow of the dryer to ambient, wherein the single flap is biased towards the closed position and is configured to rotatably move from the closed position to the open position with the exhaust flow of the dryer through the exhaust termination,
   wherein the frame includes an aperture defined therethrough, wherein the aperture includes an octagonal shape having a pair of parallel horizontal edges, a pair of parallel vertical edges, and four diagonal edges each diagonal edge connecting between one horizontal edge and one vertical edge, wherein four corner fastener holes are defined in the frame proximate a respective diagonal edge.

2. The insert of claim 1, further comprising a cage including one or more vertical or horizontal bars extending between a first and second end of the frame configured to prevent foreign objects from entering the exhaust termination when the flap is open.

3. The insert of claim 2, wherein the cage is not visible when the flap is closed and/or when the flap is open by airflow when the insert is viewed head on.

* * * * *